(12) United States Patent
Chu et al.

(10) Patent No.: US 9,172,093 B2
(45) Date of Patent: Oct. 27, 2015

(54) ELECTRODE ACTIVE MATERIAL FOR LITHIUM SECONDARY BATTERY, ELECTRODE FOR LITHIUM SECONDARY BATTERY INCLUDING THE SAME, AND LITHIUM SECONDARY BATTERY INCLUDING THE ELECTRODE

(71) Applicant: Samsung SDI Co., Ltd., Yongin-si, Gyeonggi-Do (KR)

(72) Inventors: Hee-Young Chu, Yongin-si (KR); Young-Ugk Kim, Yongin-si (KR); Seung-Uk Kwon, Yongin-si (KR); Jae-Hyuk Kim, Yongin-si (KR); Soon-Sung Suh, Yongin-si (KR); Duk-Hyoung Yoon, Yongin-si (KR); Chang-Ui Jeong, Yongin-si (KR); Yo-Han Park, Yongin-si (KR); Yury Matulevich, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 109 days.

(21) Appl. No.: 14/151,571

(22) Filed: Jan. 9, 2014

(65) Prior Publication Data
US 2014/0272572 A1    Sep. 18, 2014

(30) Foreign Application Priority Data

Mar. 18, 2013 (KR) .......................... 10-2013-0028819

(51) Int. Cl.
*H01M 4/62* (2006.01)
*H01M 4/134* (2010.01)

(52) U.S. Cl.
CPC .............. *H01M 4/628* (2013.01); *Y02E 60/122* (2013.01)

(58) Field of Classification Search
None
See application file for complete search history.

(56) References Cited

U.S. PATENT DOCUMENTS

| 2005/0034993 A1* | 2/2005 | Gozdz et al. ................... 205/57 |
| 2008/0213661 A1 | 9/2008 | Michot et al. |
| 2011/0129729 A1 | 6/2011 | Kim et al. |

FOREIGN PATENT DOCUMENTS

| JP | 2010-097761 A | 4/2010 |
| KR | 10-2007-0016431 A | 2/2007 |
| KR | 10-2008-0074241 A | 8/2008 |
| KR | 10-2009-0012182 A | 2/2009 |

* cited by examiner

*Primary Examiner* — Cynthia K Walls
(74) *Attorney, Agent, or Firm* — Knobbe Martens Olson & Bear LLP

(57) ABSTRACT

In an aspect, an electrode active material for a lithium secondary battery, the electrode active material including a silicon-based alloy and a coating film containing a polymer that includes a 3,4-ethylenedioxythiophene repeating unit and an oxyalkylene repeating unit, coated on the surface of the silicon-based alloy are provided.

17 Claims, 5 Drawing Sheets

ELECTRODE ACTIVE MATERIAL FOR LITHIUM SECONDARY BATTERY, ELECTRODE FOR LITHIUM SECONDARY BATTERY INCLUDING THE SAME, AND LITHIUM SECONDARY BATTERY INCLUDING THE ELECTRODE

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims the benefit of Korean Patent Application No. 10-2013-0028819, filed on Mar. 18, 2013, in the Korean Intellectual Property Office, the disclosure of which is incorporated herein in its entirety by reference.

BACKGROUND

1. Field

This disclosure relates to an electrode active material for a lithium secondary battery, an electrode for a lithium secondary battery, including the electrode active material, and a lithium secondary battery including the electrode.

2. Description of the Related Technology

Lithium secondary batteries are attractive as a power source for portable small electronic devices. Lithium secondary batteries including an organic electrolytic solution may have a discharge voltage two or more times as high as that of a battery using a conventional alkali aqueous solution. Accordingly, lithium secondary batteries including an organic electrolytic solution have high energy density.

A lithium secondary battery includes a positive electrode and a negative electrode, each of which includes an active material enabling intercalation and deintercalation of lithium ions, and an area between the positive electrode and the negative electrode filled with an organic electrolytic solution or a polymer electrolytic solution. Lithium secondary batteries generate energy due to an oxidation reaction and a reduction reaction respectively occurring when lithium ions are intercalated into or deintercalated from the positive electrode and the negative electrode.

Although such lithium secondary batteries have a high electromotive force and high energy density, growth of the industry has led to large demand for batteries with a longer lifespan and encouraging further research into such batteries.

SUMMARY

One or more embodiments provide an electrode active material with improved lifespan properties for a lithium secondary battery.

One or more embodiments provide an electrode for a lithium secondary battery, including the electrode active material, and a lithium secondary battery including the electrode.

Some embodiments provide an electrode active material for a lithium secondary battery includes a silicon-based alloy; and a coating film that is coated on the silicon-based alloy and contains a polymer including a 3,4-ethylenedioxythiophene repeating unit and an oxyalkylene repeating unit.

Some embodiments provide an electrode for a lithium secondary battery includes the electrode active material.

Some embodiments provide a lithium secondary battery includes a positive electrode, a negative electrode, and a separator interposed between the positive electrode and the negative electrode, wherein the negative electrode includes the electrode active material.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
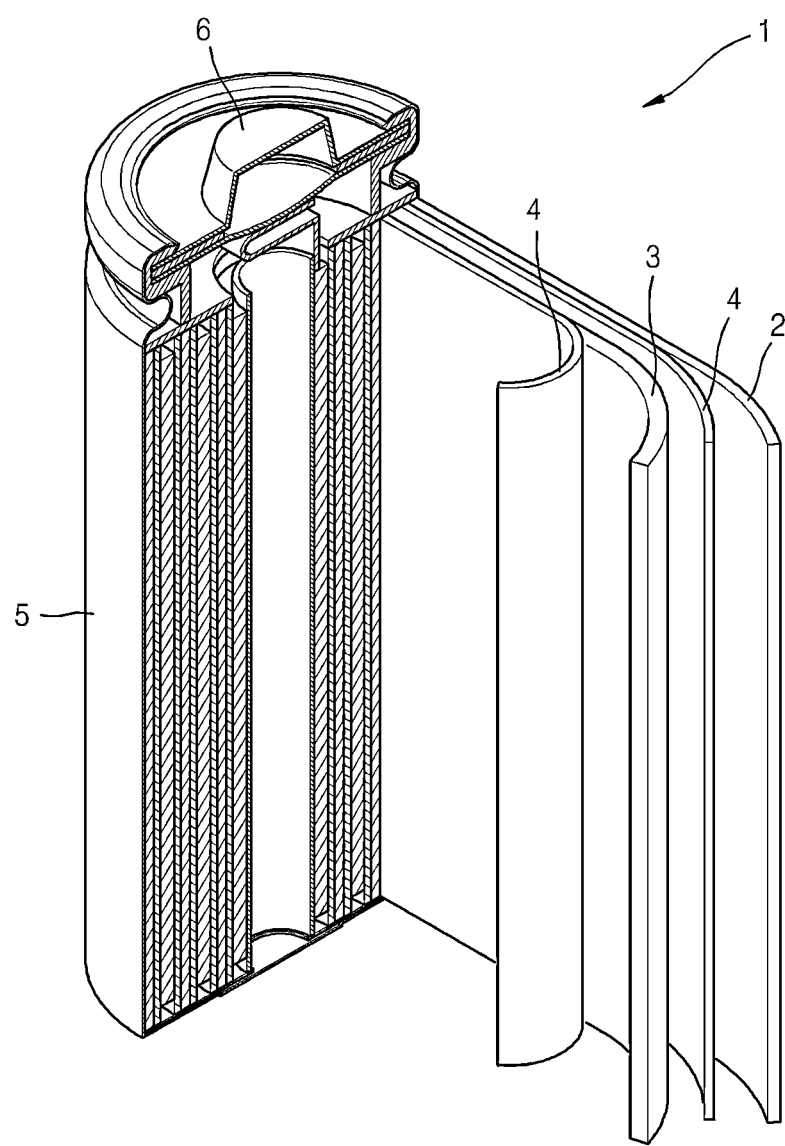
FIG. 1 is a schematic view of a lithium secondary battery according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Additional aspects will be set forth in part in the description which follows and, in part, will be apparent from the description, or may be learned by practice of the presented embodiments.

Hereinafter, an electrode active material for a lithium secondary battery, according to an embodiment of the present disclosure, an electrode for a lithium secondary battery, including the electrode active material, and a lithium secondary battery including the electrode will be described in detail.

Some embodiments provide an electrode active material for a lithium secondary battery including a silicon-based alloy that may be coated with a coating film containing a polymer including a 3,4-ethylenedioxythiophene repeating unit and an oxyalkylene repeating unit.

A silicon-based alloy is a high-capacity electrode active material, and during charging and discharging cycles, the silicon-based alloy undergoes volumetric expansion, leading to a decrease in capacity. When a negative active material volumetrically expands, a conduction path may be cut off, and the surface of the negative active material is further and continuously exposed potentially causing a side reaction with an electrolytic solution forming a solid electrolyte interface (SEI) film. Therefore, reforming the surface of silicon-based electrode active material and suppressing volumetric expansion of the surface are possible approaches to prevent such side reactions.

As a way to reform the surface of a silicon-based alloy electrode active material, a conductive agent may be coated on the surface of a silicon-based alloy electrode active material. However, when this coating method is used, crystal size of the silicon-based alloy electrode active material may increase due to a high carbonization heat treatment temperature of about 700 to about 1200° C. The increased crystal size further promotes the volumetric expansion of the silicon-based alloy electrode active material. As described above, when silicon volumetrically expands, a solid electrolyte interface (SEI) film may be formed. Accordingly, a lithium secondary battery including an electrode may have low initial efficiency and a substantial decrease in a capacity retention rate (C.R.R) causing a decrease in lifetime properties.

In some embodiments, the surface of a silicon-based alloy electrode active material may be coated with a polymer including a 3,4-ethylenedioxythiophene repeating unit and an oxyalkylene repeating unit under low temperature heat treatment conditions to form a coating film containing the polymer on the surface of the silicon-based alloy electrode active material to address the above described issues. By doing so, an electrode with improved capacity properties may be obtained in which a volumetric expansion of the silicon-based alloy electrode active material may be suppressed at the surface thereof.

In some embodiments, the coating film may be continuous or discontinuous, and for example, may have a discontinuous island shape.

In some embodiments, a thickness of the coating film may be in a range of about 0.01 to about 0.1 μm.

In some embodiments, the coating film may include a polymer including 3,4-ethylenedioxythiophene repeating unit and the oxyalkylene repeating unit. In some embodiments, the 3,4-ethylenedioxythiophene repeating unit and the oxyalkylene repeating unit may respectively be an electric conductive unit with an electric conductivity of $10^2$ S/cm or more and an ion conductive unit with an ion conductivity of $10^{-7}$ S/cm or more. When a coating film containing a polymer including such repeating units are formed on the surface of a silicon-based alloy electrode active material, an electrode formed using the silicon-based alloy electrode active material coated with the coating film may have improved conductivity and lifespan properties.

In some embodiments, an amount of the oxyalkylene repeating unit in the polymer may be in a range of about 1 to about 99 mol %. When the amount of the oxyalkylene repeating unit is within this range, an electrode with excellent conductivity may be manufactured.

An example of the oxyalkylene repeating unit is an oxyethylene repeating unit.

In some embodiments, the 3,4-ethylenedioxythiophene repeating unit is a unit represented by Formula 2 below, and the oxyalkylene repeating unit is a unit represented by Formula 3 below where the structure within the brackets is the unit that is repeated. In some embodiments, the number of repeating units in the polymer may be in the range of from about 40 to 5,000. In some embodiments, the number of repeating units in the polymer may be in the range of from about 60 to 4,000.

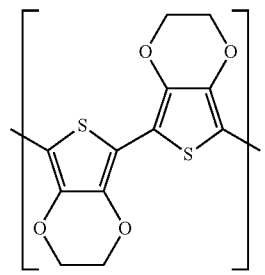

Formula 2

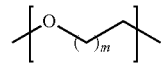

Formula 3 where m may be an integer of 1 to 15. In some embodiments, m may be an integer in the range of 1 to 10. In some embodiments, m may be 1, 2, 3, 4 or 5. In some embodiments, m may be 1 providing a structure where the oxyalkylene repeating unit is a oxyethylene repeating unit represented by Formula 3a below where the structure within the brackets is the unit that is repeated.

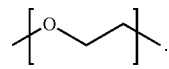

Formula 3a

In some embodiments, an amount of the polymer may be in a range of about 0.1 to about 5 parts by weight based on 100 parts by weight of the silicon-based alloy. When the amount of the polymer is within this range, conductivity of the electrode active material is high and an electrode manufactured by using the electrode active material has excellent capacity and lifespan properties.

The alignment structure of the 3,4-ethylenedioxythiophene repeating unit and the oxyethylene repeating unit in the polymer is not limited. For example, the polymer may be a block copolymer or a random copolymer, each including the 3,4-ethylenedioxythiophene repeating unit and the oxyethylene repeating unit.

In some embodiments, the polymer is a block copolymer including the 3,4-ethylenedioxythiophene repeating unit and the oxyethylene repeating unit. In the block copolymer, the amount of the 3,4-ethylenedioxythiophene repeating unit is in a range of about 1 to about 99 mol %, for example, about 20 to about 80 mol %.

In some embodiments, the polymer may be, for example, a polymer including a component represented by Formula 1.

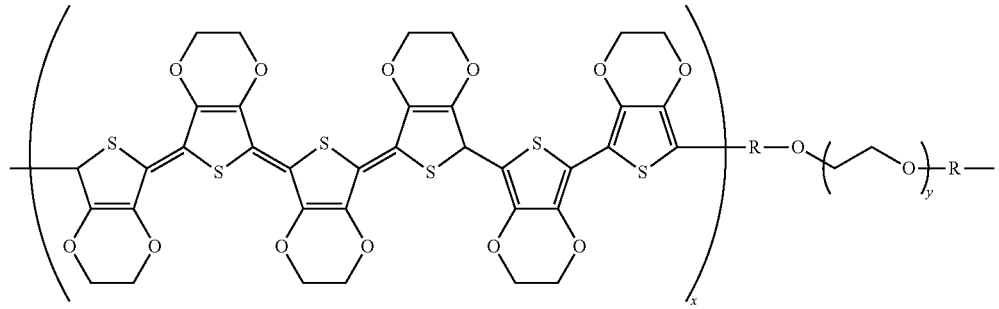

Formula 1 wherein in Formula 1, x and y may be each independently a positive integer in a range of about 5 to about 10,000, and R may be a single chemical bond, or a $C_1$-$C_{30}$ alkylene group. In some embodiments, the polymer may be, for example, poly (3,4-ethylenedioxythiophene)-block-poly(ethylene glycol).

In some embodiments, a weight average molecular weight of the polymer may be in a range of about 3,000 to about 200,000, and a polymerization degree of the polymer is controlled to be in a range that is appropriate for obtaining the weight average molecular weight range, and may be in a range of, for example, about 5 to about 10,000. The weight average molecular weight and polymerization degree of the polymer are measured by gel transmission chromatography, and when the weight average molecular weight and the polymerization degree are within these ranges, a coating film with a homogeneous thickness may be readily formed.

In some embodiments, an amount of silicon in the silicon-based alloy may be in a range of about 60 to about 72 atom %. When the amount of silicon in the silicon-based alloy is within this range, an electrode formed using the silicon-based alloy may have excellent capacity property.

In some embodiments, silicon constituting the silicon-based alloy may consist of inactive silicon and active silicon. The active silicon directly relates to a capacity of the silicon-based alloy, and the inactive silicon may have an inactive matrix structure, suppressing volumetric expansion of the silicon-based alloy.

In some embodiments, an amount of the active silicon in the silicon-based alloy may be in a range of about 40 to about 80 atom % based on 100 atom % of the sum of the active silicon and the inactive silicon. When the amount of the active silicon is within this range, a volumetric change of the silicon-based alloy during charging and discharging of an electrode manufactured using the silicon-based alloy may be efficiently suppressed and the electrode may have excellent capacity properties.

In some embodiments, the silicon-based alloy may have silicon particles precipitated inside a silicon alloy-based matrix. Due to such a structure and composition, when silicon particles expand during charging and discharging, a silicon alloy-based matrix surrounding silicon particles may efficiently control a volumetric change of silicon. Accordingly, when this silicon-based alloy is used as a negative active material, an expansion rate of an electrode during charging and discharging may decrease.

As described above, since an expansion rate of an electrode during charging and discharging decreases, problems caused by the expansion of an electrode are prevented and thus, a decrease in lifespan properties due to increased irreversible capacity of lithium may be prevented.

In some embodiments, the silicon-based alloy may include silicon, and at least one metal selected from aluminum (Al), nickel (Ni), iron (Fe), manganese (Mn), and titanium (Ti).

The silicon-based alloy may be, for example, a silicon-M-A alloy. M and A may be differently selected, and M may be, for example, aluminum (Al), titanium (Ti), or iron (Fe), and A may be, for example, nickel (Ni), iron (Fe), or manganese (Mn).

An amount of silicon in the silicon-M-A alloy may be in a range of about 60 to about 75 atom %.

In some embodiments, an amount of M in the silicon-M-A alloy may be in a range of about 5 to about 25 atom %, and an amount of A in the silicon-M-A alloy may be in a range of about 10 to about 25 atom %.

In some embodiments, the silicon-based alloy may be, for example, $Si_{68}Al_8Ni_{24}$, $Si_{60}Ti_{20}Ni_{20}$, $Si_{70}Fe_{15}Mn_{15}$, $Si_{70}Al_{15}Fe_{15}$, $Si_{70}Al_{15}Mn_{15}$, $Si_{70}Ti_{15}Fe_{15}$, $Si_{65}Ti_{17.5}Ni_{17.5}$, or $Si_{68}Ti_{16}Ni_{16}$ where the subscript numbers are percentages of each component.

Another aspect of the present embodiments provides an electrode including the electrode active material. According to an aspect of the present embodiments, the electrode may be a negative electrode.

Hereinafter, a method of manufacturing an electrode for a lithium secondary battery by using the electrode active material will be described in detail.

In some embodiments, a conductive agent, a binder, a solvent, and an electrode active material including a silicon-based alloy and a polymer including a 3,4-ethylenedioxythiophene repeating unit and an oxyalkylene repeating unit are mixed to obtain a composition for forming an electrode active material layer.

In some embodiments, the solvent may be N-methylpyrrolidone (NMP), purified water, or the like.

In some embodiments, the solvent may be added in such an amount that a solid content in the composition for forming an electrode active material layer is to be in a range of about 30 to about 50 wt %. When an amount of the solvent is within this range, a size of electrode active material particles may be controlled to be 10 μm or less, and components of the electrode active material layer are well dispersed, thereby making it easier to form an electrode active material layer.

In some embodiments, an amount of the polymer including the 3,4-ethylenedioxythiophene repeating unit and the oxyalkylene repeating unit may be in a range of about 0.1 to about 5 parts by weight based on 100 parts by weight of the silicon-based alloy. When the amount of the polymer is within this range, an electrode with excellent conductivity and lifespan properties may be obtained.

In some embodiments, the composition for forming an electrode active material layer is coated on an electrode current collector to form an electrode plate, and then the electrode plate is dried and pressed to complete the manufacturing of an electrode.

In some embodiments, the drying was performed at a temperature of about 60 to about 100° C., for example, about 70 to about 90° C.

The electrode active material may be, for example, a negative active material, and the electrode may be, for example, a negative electrode.

In some embodiments, the negative active material includes the silicon-based alloy as a necessary component, and may further include other negative active materials that are conventionally used in a lithium secondary battery.

An example of such other negative active materials may be a second material selected from graphite that allow lithium ions to intercalate thereinto or deintercalate therefrom, a carbonaceous material, such as carbon, lithium metal, an alloy thereof, a silicon oxide-based mater, and a mixture thereof.

Some embodiments provide a silicon-based alloy and a carbonaceous material are used as the negative active material, and the carbonaceous material may be graphite or a pitch that is an amorphous carbon.

As described above, when the carbonaceous material is used together, an oxidation reaction of a silicon-based alloy as the negative active material is suppressed and a SEI film is effectively formed to form a stable thin film, and also, electric conductivity is improved, and thus, charge and discharge characteristics of lithium are further improved.

When the carbonaceous material is used, for example, the carbonaceous material may be coated on a surface of a silicon-based alloy that is an anode active material.

An amount of the second material used together with the silicon-based alloy may be in a range of about 1 to about 99 parts by weight based on 100 parts by weight of the total amount of the silicon-based alloy and the negative active material.

When the negative active material includes the silicon-based alloy as a major component, an amount of the silicon-based alloy may be, for example, in a range of about 95 to about 99 parts by weight based on 100 parts by weight of the total amount of the second material and the silicon-based alloy. When graphite or a pitch that is an amorphous carbon is used as the second material, the graphite and the pitch that is an amorphous carbon may be coated on the surface of the silicon-based alloy.

When the negative active material includes the silicon-based alloy as a minor component, an amount of the silicon-based alloy may be, for example, in a range of about 1 to about 5 parts by weight based on 100 parts by weight of the total amount of the second material and the silicon-based alloy. When graphite or a pitch that is an amorphous carbon is used as the second material, the graphite and the pitch that is an amorphous carbon may act as a buffer of the silicon-based alloy and may further improve lifespan characteristics of an electrode.

In some embodiments, an amount of the binder may be in a range of about 1 to about 10 parts by weight based on 100 parts by weight of the total weight of the negative active material. An example of the binder are polyvinylidene fluoride, polyvinylalcohol, carboxymethylcellulose (CMC), starch, hydroxypropylcellulose, re-generation cellulose, polyvinylpyrrolidone, polyamideimide, polyethylene, polypropylene, ethylene-propylene-diene terpolymer (EPDM), sulfonated EPDM, styrene butadiene rubber, fluorine rubber, and a vinylidene fluoride copolymer having one or more functional groups selected from a carboxylic group, an epoxy group, a hydroxyl group, and a carbonyl group.

When the amount of the binder is within this range, a binding force of an electrode active material with respect to a current collector may be improved, thereby enabling manufacturing of an electrode and battery with improved lifetime and stability properties.

In some embodiments, an amount of the conductive agent may be in a range of about 1 to about 10 parts by weight based on 100 parts by weight of the total weight of the negative active material. When the amount of the conductive agent is within this range, a finally obtained electrode may have excellent conductivity.

The conductive agent may not be particularly limited as long as it does not cause any chemical change in a corresponding battery and has conductivity, and examples of the conductive agent are graphite, such as natural graphite or artificial graphite; a carbonaceous material, such as, carbon black, acetylene black, ketjen black, channel black, furnace black, lamp black, or summer black; a conductive fiber, such as carbon fiber or metal fiber; metal powder, such as aluminum or nickel powder; a conductive whisker, such as zinc oxide or potassium titanate; a conductive metal oxide, such as titanium oxide; and a conductive material, such as a polyphenylene derivative.

In some embodiments, a negative current collector may be formed to a thickness of about 3 to about 500 μm. The negative current collector may not be particularly limited as long as it does not cause any chemical change in a corresponding battery and has conductivity, and examples of a material for forming the negative current collector are copper, stainless steel, aluminum, nickel, titanium, heat treated carbon, and copper or stainless steel that is surface treated with carbon, nickel, titanium, silver, or an aluminum-cadmium alloy. In addition, like a positive current collector, the negative current collector may have a fine uneven structure at its surface to increase a binding force thereof with respect to a negative active material, and the negative current collector may have various forms, such as a film, sheet, foil, net, porous, foam, or non-woven form.

Hereinafter, a process of manufacturing a lithium secondary battery by using the electrode will be described. A lithium secondary battery according to an embodiment of the present disclosure includes, for example, a positive electrode, a negative electrode, a lithium salt-containing non-aqueous electrolyte, and a separator.

First, a positive active material, a conductive agent, a binder, and a solvent may be mixed to obtain a composition for forming a positive electrode active material layer, and the composition may be coated and dried on a current collector to complete manufacturing of a positive electrode.

In some embodiments, the positive active material may be any one of various positive active materials that are conventionally used in a lithium secondary battery.

As for a positive active material, a compound (lithiated intercalation compound) that reversibly allows lithium to intercalate thereinto and deintercalate therefrom may be used.

In some embodiments, the positive active material may be at least one selected from a lithium cobalt oxide represented by $LiCoO_2$; a lithium nickel oxide represented by $LiNiO_2$; a lithium manganese oxide represented by $Li_{1+x}Mn_{2-x}O_4$ (wherein, x is 0 to 0.33), a lithium manganese oxide represented by $LiMnO_3$, $LiMn_2O_3$, or $LiMnO_2$; a lithium copper oxide represented by $Li_2CuO_2$; a lithium iron oxide represented by $LiFe_3O_4$; a lithium vanadium oxide represented by $LiV_3O_8$; a copper vanadium oxide represented by $Cu_2V_2O_7$; a vanadium oxide $V_2O_5$; a Ni site-type lithium nickel oxide represented by $LiNi_{1-x}M_xO_2$ (where, M=Co, Mn, Al, Cu, Fe, Mg, B (boron) or Ga, and x=0.01~0.3); a lithium manganese composite oxide represented by $LiMn_{2-x}M_xO_2$ (wherein, M=Co, Ni, Fe, Cr, Zn or Ta, and x=0.01~0.1) or $Li_2Mn_3MO_8$ (wherein M=Fe, Co, Ni, Cu, or Zn); a lithium manganese oxide of which some Li are substituted with an alkali earth metal ion represented by $LiMn_2O_4$; a disulfide compound; and an iron molybdenum represented by $Fe_2(MoO_4)_3$.

As the positive active material, at least one selected from a lithium cobalt oxide, a lithium nickel cobalt, manganese oxide, a lithium nickel cobalt aluminum oxide, a lithium iron phosphate oxide, and lithium manganese oxide may be used. However, the positive active material is not limited thereto. For example, any one of various materials that are used as a positive active material in the art may be used.

For example, the positive active material may be a compound represented by one of $Li_aA_{1-b}B^1{}_bD^1{}_2$ (wherein $0.90 \le a \le 1.8$, and $0 \le b \le 0.5$), $Li_aE_{1-b}B^1{}_bO_{2-c}D^1{}_c$ (wherein $0.90 \le a \le 1.8$, $0 \le b \le 0.5$, and $0 \le c \le 0.05$), $Li_aE_{2-b}B^1{}_bO_{4-c}D^1{}_c$ (wherein $0 \le b \le 0.5$, and $0 \le c \le 0.05$), $Li_aNi_{1-b-c}Co_bB^1{}_cD^1{}_\alpha$ (wherein $0.90 \le a \le 1.8$, $0 \le b \le 0.5$, $0 \le c \le 0.05$, and $0 \le \alpha \le 2$), $Li_aNi_{1-b-c}Co_bB^1{}_cO_{2-\alpha}F^1{}_\alpha$ (wherein $0.90 \le a \le 1.8$, $0 \le b \le 0.5$, $0 \le c \le 0.05$, and $0 \le \alpha \le 2$), $Li_aNi_{1-b-c}Co_bB^1{}_cO_{2-\alpha}F^1{}_2$ (wherein $0.90 \le a \le 1.8$, $0 \le b \le 0.5$, $0 \le c \le 0.05$, and $0 \le \alpha \le 2$), $Li_aNi_{1-b-c}Mn_bB_cD^1{}_\alpha$ (wherein $0.90 \le a \le 1.8$, $0 \le b \le 0.5$, $0 \le c \le 0.05$, and $0 \le \alpha \le 2$), $Li_aNi_{1-b-c}Mn_bB^1{}_cO_{2-\alpha}F^1{}_\alpha$ (wherein $0.90 \le a \le 1.8$, $0 \le b \le 0.5$, $0 \le c \le 0.05$, and $0 \le \alpha \le 2$), $Li_aNi_{1-b-c}Mn_bB^1{}_cO_{2-\alpha}F^1{}_2$ (wherein $0.90 \le a \le 1.8$, $0 \le b \le 0.5$, $0 \le c \le 0.05$, and $0 \le \alpha \le 2$), $Li_aNi_bE_cG_dO_2$ (wherein $0.90 \le a \le 1.8$, $0 \le b \le 0.9$, $0 \le c \le 0.5$, and $0.001 \le d \le 0.1$), $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$), $Li_aNiG_bO_2$ (wherein $0.90 \le a \le 1.8$, and $0.001 \le b \le 0.1$); $Li_aCoG_bO_2$ (wherein $0.90 \leq a \leq 1.8$, and $0.001 \leq b \leq 0.1$), $Li_aMnG_bO_2$ (wherein $0.90 \leq a \leq 1.8$, and $0.001 \leq b \leq 0.1$), $Li_aMn_2G_bO_4$ (wherein $0.90 \leq a \leq 1.8$, and $0.001 \leq b \leq 0.1$), $QO_2$, $QS_2$, $LiQS_2$, $V_2O_5$, $LiV_2O_5$, $LiI^1O_2$, $LiNiVO_4$, $Li_{(3-f)}J_2(PO_4)_3$ (wherein $0 \leq f \leq 2$), $Li_{(3-f)}Fe_2(PO_4)_3$ (wherein $0 \leq f \leq 2$), and $LiFePO_4$.

In the formulae above, A may be Ni, Co, Mn, or a combination thereof; $B^1$ may be Al, Ni, Co, Mn, Cr, Fe, Mg, Sr, V, a rare-earth element, or a combination thereof; $D^1$ may be O (oxygen), F (fluorine), S (sulfur), P (phosphorus), or a combination thereof; E may be Co, Mn, or a combination thereof; $F^1$ may be F (fluorine), S (sulfur), P (phosphorus), or a combination thereof; G may be Al, Cr, Mn, Fe, Mg, La, Ce, Sr, V, or a combination thereof; Q may be Ti, Mo, Mn, or a combination thereof; $I^1$ may be Cr, V, Fe, Sc, Y, or a combination thereof; and J may be V, Cr, Mn, Co, Ni, Cu, or a combination thereof.

These compounds may have a coating layer on their surfaces, or these compounds may be mixed with a compound having a coating layer. In some embodiments, the coating layer may include an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. In some embodiments, Mg, Al, Co, K, Na, Ca, Si, Ti, V, Sn, Ge, Ga, B (boron), As, Zr, or a mixture thereof may be used as a coating element included in the coating layer. In some embodiments, the coating layer may be formed by using any one of various coating methods that are performed using the compounds and the elements and do not affect properties of the positive active material (for example, spray coating, immersion, or the like).

Examples of such positive active materials are $LiNiO_2$, $LiCoO_2$, $LiMn_xO_2$, (x=1, 2), $LiNi_{1-x}Mn_xO_2$ (0<x<1), $Li Ni_{1-x-y}Co_xMn_yO_2$ ($0 \leq x \leq 0.5$, $0 \leq y \leq 0.5$), $LiFeO_2$, $V_2O_5$, TiS, and MoS.

Amounts of the binder and the conductive agent may be used at the same levels as used to manufacture the negative electrode.

In some embodiments, the solvent may be N-methylpyrrolidone, purified water, or the like.

In some embodiments, an amount of the solvent may be in a range of about 1 to about 500 parts by weight based on 100 parts by weight of the positive active material. When the amount of the solvent is within this range, the positive active material may be easily formed.

In some embodiments, a positive current collector may have a thickness of about 3 to about 500 μm, and may not be particularly limited as long as it does not cause any chemical change in a corresponding battery and has conductivity, and examples of a material for forming the positive current collector are stainless steel, aluminum, nickel, titanium, heat treated carbon, and aluminum or stainless steel that is surface treated with carbon, nickel, titanium, or silver. In some embodiments, a current collector may have a fine uneven structure at its surface to increase a binding force with respect to a positive active material, and the current collector may have various forms, such as a film, sheet, foil, net, porous, foam, or non-woven form.

In some embodiments, a separator may be disposed between the positive electrode and the negative electrode.

In some embodiments, the separator may have a pore size of about 0.01 to about 10 μm, and a thickness of about 5 to about 300 μm. In some embodiments, the separator may be formed of polyethylene, polypropylene, polyvinylidene fluoride, and may be multi layers of two or more of these. For example, the separator may be a mixed multilayer, such as a polyethylene/polypropylene two-layer separator, a polyethylene/polypropylene/polyethylene three-layer separator, or a polypropylene/polyethylene/polypropylene three-layer separator.

When a solid electrolyte, such as a polymer, is used as an electrolyte, the solid electrolyte may also act as a separator.

In some embodiments, a lithium salt-containing non-aqueous electrolyte consists of a non-aqueous organic solvent and a lithium salt. Examples of a non-aqueous electrolyte are a non-aqueous electrolytic solution, an organic solid electrolyte, and an inorganic solid electrolyte.

Non-limiting examples of a non-aqueous organic solvent are N-methyl-2-pyrrolidinone, propylene carbonate, ethylene carbonate, butylene carbonate, dimethyl carbonate, diethyl carbonate, gamma-butyrolactone, 1,2-dimethoxy ethane, 2-methyl tetrahydrofurane, N,N-dimethylsulfoxide, 1,3-dioxorane, N,N-formamide, N,N-dimethylformamide, acetonitrile, nitromethane, methyl formate, methyl acetate, trimester phosphate, trimethoxy methane, sulforane, methyl sulforane, 1,3-dimethyl-2-imidazolidinone, propylene carbonate, tetrahydrofurane, ether, methyl propionate, and ethyl propionate.

Non-limiting examples of the organic solid electrolyte are a polyethylene derivative, a polyethylene oxide derivative, a polypropylene oxide derivative, a phosphate ester polymer, polyester sulfide, polyvinyl alcohol, poly fluoro vinylidene, and an ionic decomposer-containing polymer.

Non-limiting examples of the inorganic solid electrolyte are nitrides, halides, and sulfates of Li, such as $Li_3N$, LiI, $Li_5NI_2$, $Li_3N$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be any one of various materials that are easily dissolved in the non-aqueous based electrolyte, and examples of such materials are LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl4$, $CH_3SO_3L_1$, $CF_3SO_3Li$, $(CF_3SO_2)_2NLi$, chloroborane lithium, low aliphatic lithium carbonate, and tetrakisphenyl lithium borate. In addition, to improve charging and discharging characteristics and fire retardancy, the non-aqueous electrolyte may further include pyridine, triethylphosphite, triethanolamine, cyclic ethers, ethylene diamine, n-glyme, hexatriamide phosphate, a nitrobenzene derivative, sulfur, quinine imine dye, N-substituted oxazolidinone, N,N-substitutted imidazolidine, ethylene glycol dialkyl ether, ammonium salt, pyrrole, and 2-methoxy ethanol, or trichloride aluminum. According to another embodiment, a halogen-containing solvent, such as carbon tetrachloride or trifluoroethylene, may be further included to provide an incombustibility property, and according to another embodiment, carbon dioxide gas may be further included to improve high-temperature preservation characteristics.

FIG. 1 is a schematic view of a lithium secondary battery 1 according to an embodiment.

Referring to FIG. 1, the lithium secondary battery 1 includes a positive electrode 3, a negative electrode 2, and a separator 4. In some embodiments, the positive electrode 3, the negative electrode 2, and the separator 4 may be wound or folded to be placed in a battery case 5. Subsequently, an organic electrolytic solution may be injected into the battery case 5, and sealed with a cap assembly 6, thereby completing the manufacture of the lithium secondary battery 1. In some embodiments, the battery case may be cylindrical, rectangular, thin film-formed, or the like. For example, the lithium secondary battery 1 may be a thin film-formed battery. For example, the lithium secondary battery 1 may be a lithium ion battery.

In some embodiments, the lithium secondary battery may be a lithium ion battery having a charging voltage of 4.3 V or more.

In some embodiments, the separator 4 may be disposed between the positive electrode 3 and the negative electrode 2 to form a battery assembly. A plurality of battery assemblies may be stacked in a bi-cell structure and then impregnated with an organic electrolytic solution, and the obtained result is housed in a pouch, followed by sealing, thereby completing the manufacture of a lithium ion polymer battery.

Also, a plurality of the battery assemblies may be stacked to form a battery pack, and the battery pack may be used in various devices that require high capacitance and high power output. For example, the battery assemblies may be used in a notebook computer, a smartphone, an electric vehicle, or the like.

In particular, due to its excellent high-rate characteristics and lifespan characteristics, the lithium battery may be suitable for use in an electric vehicle (EV), for example, a hybrid car, such as a plug-in hybrid electric vehicle (PHEV).

Hereinafter, embodiments of the present invention are described by referring to examples, which are presented herein for illustrative purpose only.

EXAMPLES

Example 1

Manufacturing Negative Electrode 10 g of a silicon-based alloy ($Si_{69}Ti_{11.5}Ni_{11.5}Fe_8$) was added to 10 g of 1 wt % of poly(3,4-ethylenedioxythiophene)-block-poly(ethylene glycol) dispersion (PEDOT-block-PEG) (in propylene carbonate) (Aldrich, product number: 649783, Sigma-Aldrich Corp., St Louis Mo.), and the mixture was sufficiently stirred by using a mixer for 4 hours or more.

The resulting product was filtered to remove impurities therefrom to prepare a composition for forming a negative active material layer. Deionized water was used as the solvent in such an amount that a total amount of a solid content in the composition for preparing the negative active material layer was 40 wt %.

The composition was coated on a copper (Cu)-foil to form a coating film having a thickness of about 14 μm thereon to form a thin electrode plate, and then, the resultant structure was dried at a temperature of about 80° C. for 8 hours or more, and then pressed to complete the manufacturing of a negative electrode.

Example 2

Manufacturing Negative Electrode

A negative electrode was manufactured in the same manner as in Example 1, except that 10 g of 5 wt % PEDOT-block-PEG dispersion was used instead of 10 g of 1 wt % PEDOT-block-PEG dispersion.

Examples 3 and 4

Manufacturing Negative Electrodes

Negative electrodes were manufactured in the same manner as in Example 1, except that an amount of an oxyethylene repeating unit in a PEDOT-block-PEG copolymer was 20 mol % and 80 mol %, respectively.

Comparative Example 1

Manufacturing Negative Electrode

Negative electrodes were manufactured in the same manner as in Example 1, except that a composition for forming the negative active material layer was prepared in the following manner.

A silicon-based alloy ($Si_{60}Ti_{20}Ni_{20}$) (an amount of active silicon: about 41.7 atom %) that is an active material, ketjen black that is a conductive agent, and polyamide imide (PAI) that is a binder were mixed at a weight ratio of 88:4:8 and then water was added thereto to prepare a composition for forming a negative active material layer.

Water in the composition for forming the negative active material layer was used in such an amount that a total solid content in the composition was 50 wt %.

Comparative Example 2

Manufacturing Negative Electrode

A negative electrode was manufactured in the same manner as in Example 1, except that 10 g of 1 wt % poly(3,4-ethylenedioxythiophene)-poly(styrenesulfonate) dispersion (in deionized water) was used instead of 10 g of 1 wt % (PEDOT-block-PEG) dispersion (in propylene carbonate).

Comparative Example 3

Manufacturing Negative Electrode

A negative electrode was manufactured in the same manner as in Example 1, except that 10 g of 1 wt % polyethylene glycol dispersion (in deionized water) was used instead of 10 g of 1 wt % (PEDOT-block-PEG) dispersion (in propylene carbonate).

Manufacturing Example 1

Manufacturing Coin Cell

First, a mixture of 96 g of lithium composite oxide $LiNi_{0.5}Co_{0.2}Mn_{0.3}O_2$, 2 g of polyvinylidene fluoride, and 47 g of N-methylpyrrolidone that is a solvent, and 2 g of carbon black that is a conductive agent was stirred by using a mixer to remove bubbles therefrom to prepare a homogeneously dispersed composition for forming a positive active material layer.

The composition was coated on an aluminum film by using a doctor blade to form a thin electrode plate, which was then dried at a temperature of 135° C. for 3 hours or more, and then pressed and vacuum-dried to form a positive electrode.

A negative electrode manufactured according to Example 1 was used as a negative electrode herein.

A 2032-type coin-full cell was manufactured by using the negative electrode and the positive electrode. Between the positive electrode and the lithium metal counter electrode, that is, the negative electrode, was disposed a separator (thickness: about 16 μm) formed of a porous polyethylene (PE) film, followed by injection of an electrolytic solution, thereby completing manufacturing of a 2032-type coin cell.

In this regard, for use as an electrolytic solution, a solution containing 1.1M $LiPF_6$ dissolved in a mixed solvent of ethylenecarbonate (EC) and ethylmethylcarbonate (EMC) at a volumetric ratio of 3:5 was used.

Manufacturing Examples 2 through 4

Manufacturing Coin-Full Cells

Coin-full cells were manufactured in the same manner as in Manufacturing Example 1, except that the negative electrodes of Examples 2 through 4 were used instead of the negative electrode of Example 1.

Comparative Manufacturing Examples 1 through 3

Manufacturing Coin Cells

Coin-full cells were manufactured in the same manner as in Manufacturing Example 1, except that the negative electrodes of Comparative Examples 1 through 3 were used instead of the negative electrode of Example 1.

Evaluation Example 1

Scanning Electron Microscope

Figure 2:
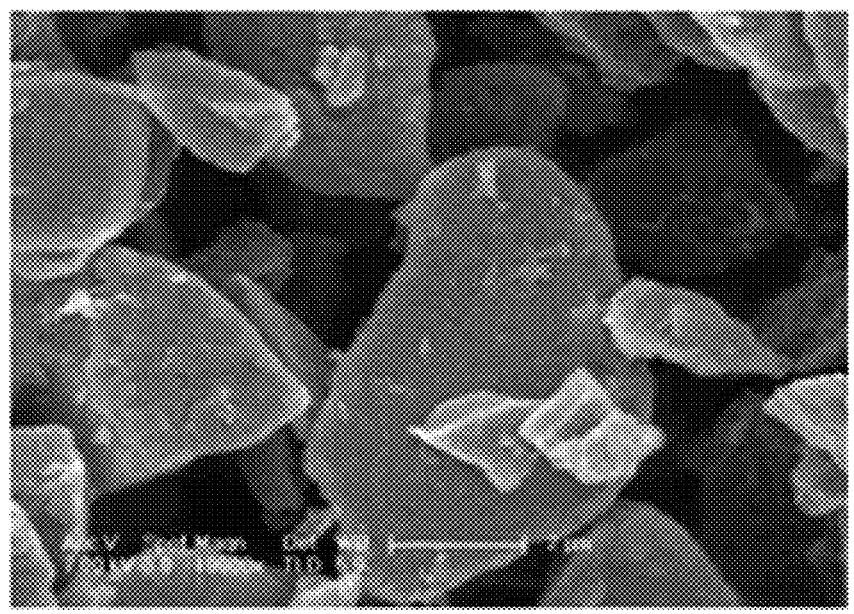
FIGS. 2 and 3 show electron scan microscopic images of a negative electrode manufactured according to Example 1.
Figure 3:
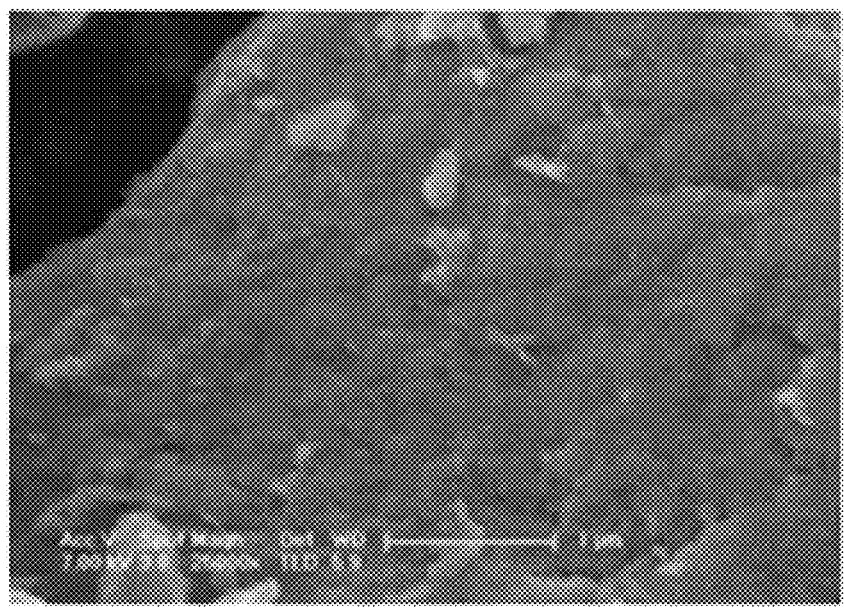

The negative electrode manufactured according to Example 1 was analyzed under an electron scan microscope, and results thereof are shown in FIGS. 2 and 3.

FIG. 2 shows a scanning electron microscope image of the negative electrode enlarged by a magnification of 10000, and FIG. 3 shows a scanning electron microscope image of the negative electrode enlarged by a magnification of 25000.

Referring to FIGS. 2 and 3, it was confirmed that PEDOT-block-PEG islands were discontinuously coated on the surface of the silicon-based alloy.

Evaluation Example 2

Electric Conductivity of Negative Electrode

Figure 4:
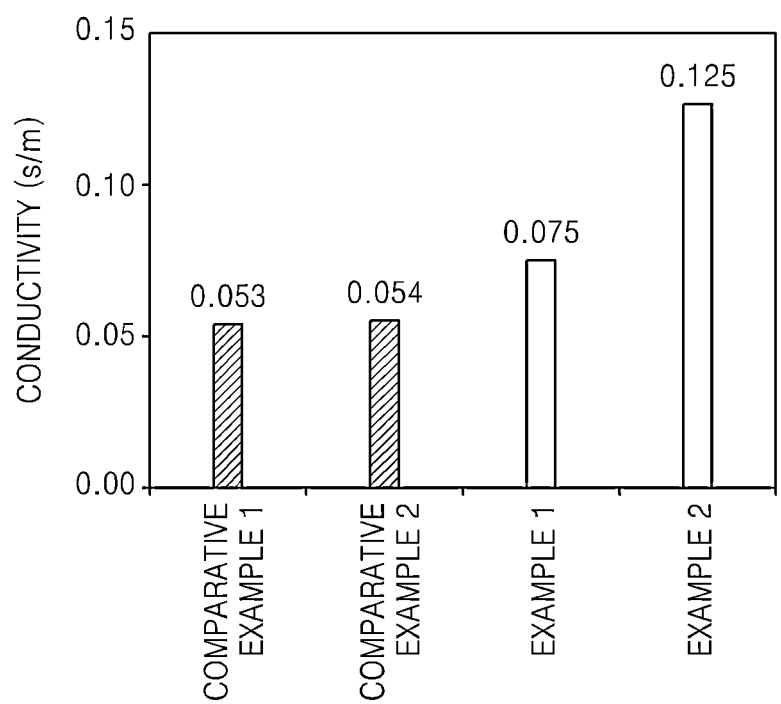
FIG. 4 shows conductivity of negative electrodes manufactured according to Examples 1 and 2 and Comparative Examples 1 and 2.

A pressure of 0.06 Mpa was applied to the negative electrode manufactured according to Examples 1 through 4 and Comparative Examples 1 and 2 by using an electrode jig and resistance thereof under conditions including a current of 10 mA, a frequency of 1 KHz, and for a period of time of 15 seconds was measured to calculate specific resistance, and specific resistance values were calculated as electric conductivity and results thereof are shown in FIG. 4.

Referring to FIG. 4, it was confirmed that the negative electrodes of Examples 1 and 2 have higher conductivity than the negative electrodes of Comparative Examples 1 and 2.

Also, it was confirmed that like the negative electrodes of Examples 1 and 2, the negative electrodes of Examples 3 and 4 had higher conductivity than the negative electrodes.

Evaluation Example 3

Cycle Lifespan

The coin-full cells manufactured according to Manufacturing Examples 1 through 4 and Comparative Manufacturing Examples 1 through 3 were charged and discharged once at 0.1C to perform a formation process. Then, the coin-full cells were charged and discharged at 0.2 C once to identify initial charging and discharging properties and then, repeatedly charged and discharged 100 times at 1 C to identify cyclic properties. During charging, the charging began with a constant current (CC) mode and then a constant voltage (CV) mode, and a cut-off was set to occur at 0.01 C and at 4.2 V, and during discharging, in a CC mode, a cut-off was set to occur at 1.0 C and at 2.75 V.

Figure 5:
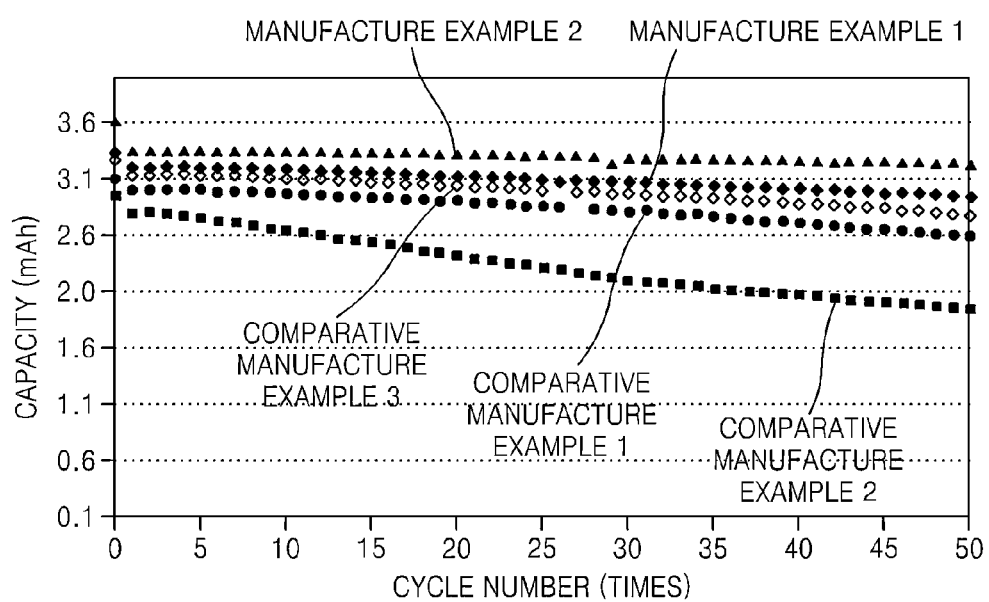
FIG. 5 shows cyclic properties of coin-full cells manufactured according to Manufacturing Examples 1 and 2 and Comparative Manufacturing Examples 1 through 3.

A change in discharging capacity according to cycle was evaluated and results thereof are shown in FIG. 5.

Referring to FIG. 5, it was confirmed that the lithium secondary batteries of Manufacturing Examples 1 and 2 had better cycle lifespan properties than the lithium secondary batteries of Comparative Manufacturing Examples 1 through 3. Also, the lithium secondary batteries of Manufacturing Examples 3 and 4, like the lithium secondary batteries of Manufacturing Examples 1 and 2, had excellent cycle lifespan properties.

Evaluation Example 4

Lifespan Characteristics

The coin-full cells manufactured according to Manufacturing Examples 1 through 4 and Comparative Manufacturing Examples 1 through 3 were charged and discharged once at 0.1 C to perform a formation process. Then, the coin-full cells were charged and discharged at 0.2 C once to identify initial charging and discharging properties and then, repeatedly charged and discharged 50 times at 1 C to identify cyclic properties. During charging, the charging began with a CC mode and then a CV mode, and a cut-off was set to occur at 0.01 C and at 4.2 V, and during discharging, in a CC mode, a cut-off was set to occur at 1.0 C and at 2.75 V.

Figure 6:
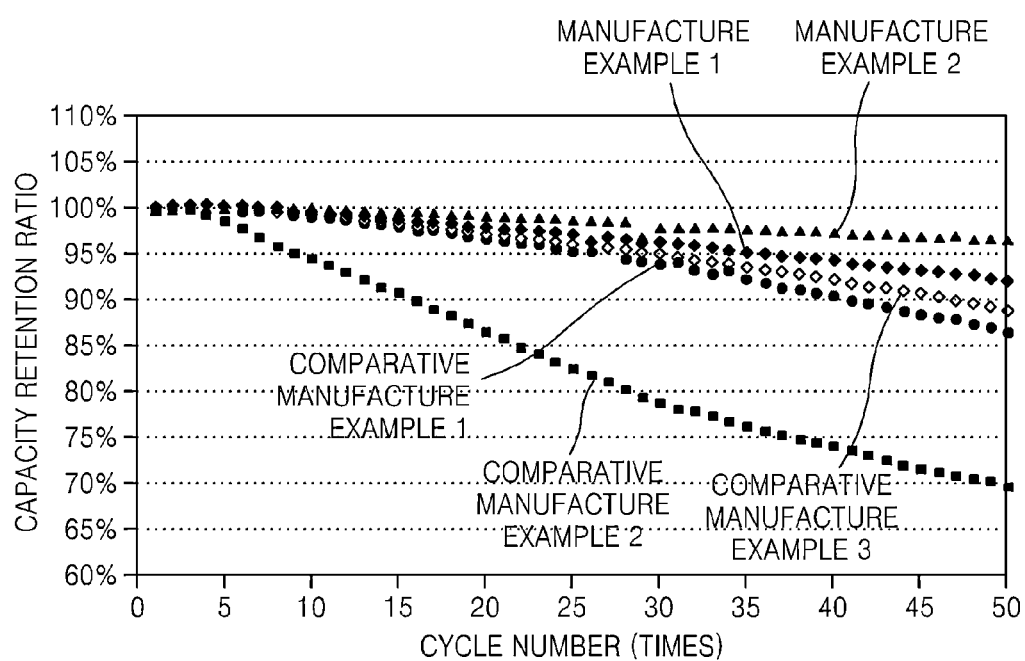
FIG. 6 shows lifespan properties of coin-full cells manufactured according to Manufacturing Examples 1 and 2 and Comparative Manufacturing Examples 1 through 3.

Results of the lifespan properties are shown in FIG. 6.

$$\text{Capacity retention ratio in 100th cycle [\%]} = [\text{discharge capacity in 100th cycle/discharge capacity in } 1^{st} \text{ cycle}] \times 100 \quad \text{Equation 1}$$

Referring to FIG. 6, it was determined that capacity retention ratios of the coin-full cells of Manufacturing Examples 1 and 2 were improved compared to those of the coin-full cells of Comparative Manufacturing Examples 1 through 3. Also, it was determined that the coin-full cells of Manufacturing Examples 3 and 4, like those of Manufacturing Examples 1 and 2, had an excellent capacity retention ratio.

As described above, according to the one or more of the above embodiments, an electrode active material for a lithium secondary battery may enable manufacturing of an electrode with improved conductivity for a lithium secondary battery. The electrode may enable manufacturing of a lithium secondary battery with improved cyclic properties and lifespan properties.

In the present disclosure, the terms "Manufacturing Example," "Example," "Evaluation Example," and "Comparative Example" are used arbitrarily to simply identify a particular example or experimentation and should not be interpreted as admission of prior art. It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An electrode active material for a lithium secondary battery, the electrode active material comprising:
   a silicon-based alloy; and
   a coating film containing a polymer that includes a 3,4-ethylenedioxythiophene repeating unit and an oxyalkylene repeating unit, coated on the surface of the silicon-based alloy.

2. The electrode active material of claim 1, wherein an amount of the oxyalkylene repeating unit in the polymer is in a range of about 1 to about 99 mol %, and an amount of the 3,4-ethylenedioxythiophene repeating unit in the polymer is in a range of about 1 to about 99 mol %.

3. The electrode active material of claim 1, wherein an amount of the polymer is in a range of about 0.1 to about 5 parts by weight based on 100 parts by weight of the silicon-based alloy.

4. The electrode active material of claim 1, wherein the polymer is a polymer including a component represented by Formula 1 below:

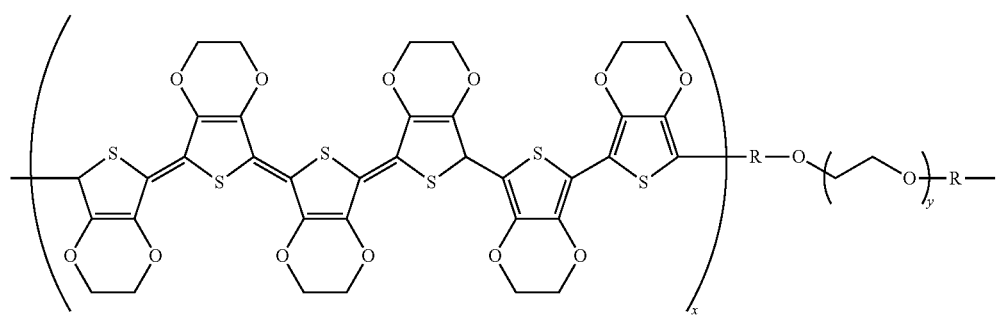

Formula 1 wherein, in Formula 1, x and y are each independently a positive integer in a range of about 5 to about 10,000, and R is a single bond or a $C_1$-$C_{30}$ alkylene group.

5. The electrode active material of claim 1, wherein a weight average molecular weight of the polymer is in a range of about 3000 to about 200,000.

6. The electrode active material of claim 1, wherein an amount of silicon in the silicon-based alloy is in a range of about 60 to about 72 atom %.

7. The electrode active material of claim 1, wherein the silicon-based alloy comprises an active silicon and an inactive silicon.

8. The electrode active material of claim 7, wherein an amount of the active silicon in the silicon-based alloy is in a range of about 40 to about 80 atom % based on the total amount of the active silicon and the inactive silicon.

9. The electrode active material of claim 1, wherein the silicon-based alloy comprises silicon, and at least one metal selected from aluminum (Al), nickel (Ni), iron (Fe), manganese (Mn), and titanium (Ti).

10. The electrode active material of claim 1, wherein the silicon-based alloy is represented by silicon-M-A alloy, and M and A are differently selected and M is aluminum (Al), titanium (Ti), or iron (Fe) and A is nickel (Ni), iron (Fe) or manganese (Mn), where when M is iron (Fe) then A is nickel (Ni) or manganese (Mn) and when A is iron (Fe) then M is aluminum (Al) or titanium (Ti).

11. The electrode active material of claim 10, wherein in the silicon-M-A alloy, an amount of silicon is in a range of about 60 to about 75 atom %, M is in a range of about 5 to about 25 atom %, and A is in a range of about 10 to about 25 atom %.

12. The electrode active material of claim 1, wherein the silicon-based alloy is $Si_{68}Al_8Ni_{24}$, $Si_{60}Ti_{20}Ni_{20}$, $Si_{70}Fe_{15}Mn_{15}$, $Si_{70}Al_{15}Fe_{15}$, $Si_{70}Al_{15}Mn_{15}$, $Si_{70}Ti_{15}Fe_{15}$, $Si_{65}Ti_{17.5}Ni_{17.5}$, or $Si_{68}Ti_{16}Ni_{16}$.

13. The electrode active material of claim 1, wherein the electrode active material is a negative active material.

14. The electrode active material of claim 1, wherein the coating film is in the form of a discontinuous island-shape coating film.

15. The electrode active material of claim 1, wherein a thickness of the coating film is in a range of about 0.01 to about 0.1 μm.

16. An electrode for a lithium secondary battery, the electrode comprising the electrode active material of claim 1; and a current collector.

17. An lithium secondary battery comprising a positive electrode, a negative electrode, and a separator disposed between the positive electrode and the negative electrode, wherein the negative electrode includes the electrode active material of claim 1.

* * * * *